Patented Mar. 8, 1932

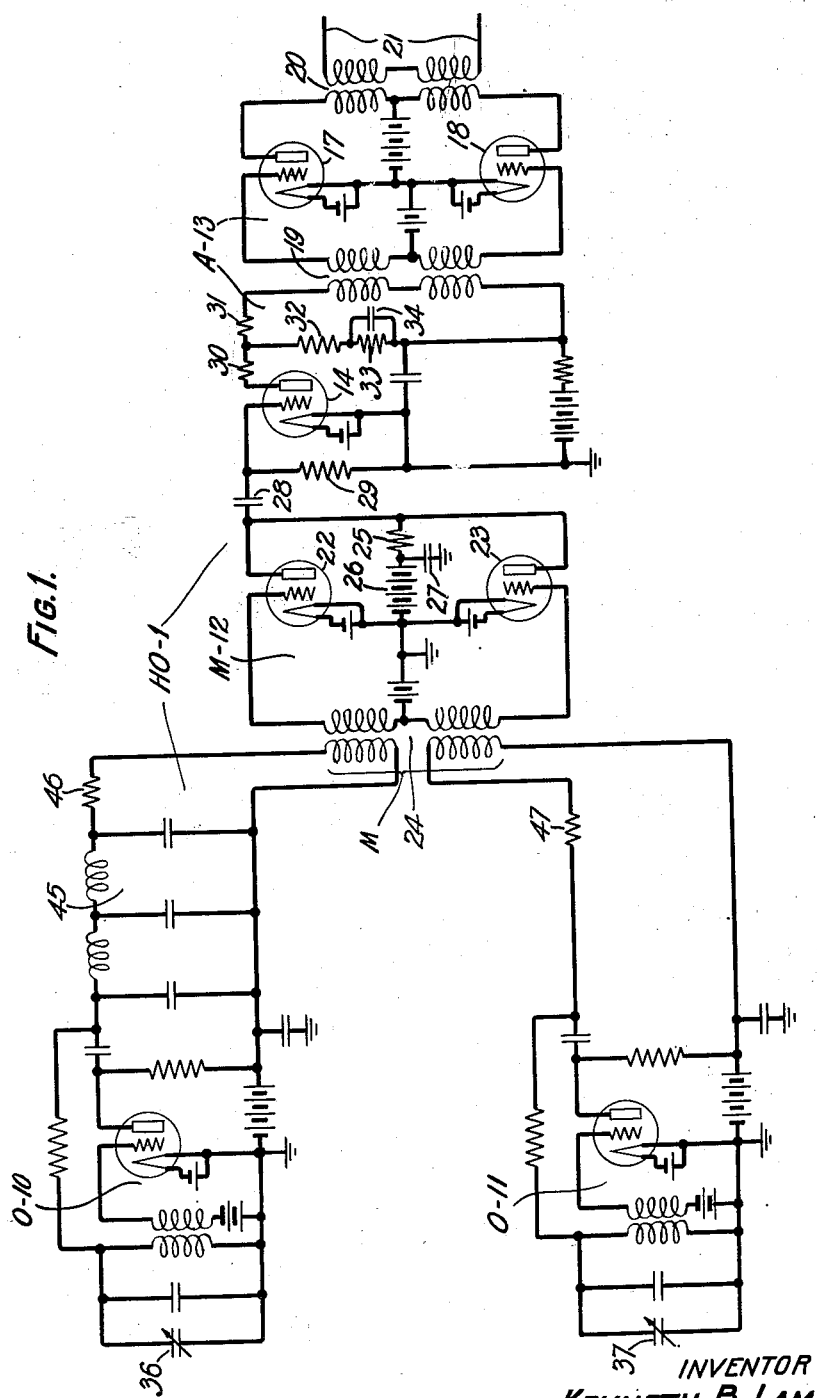

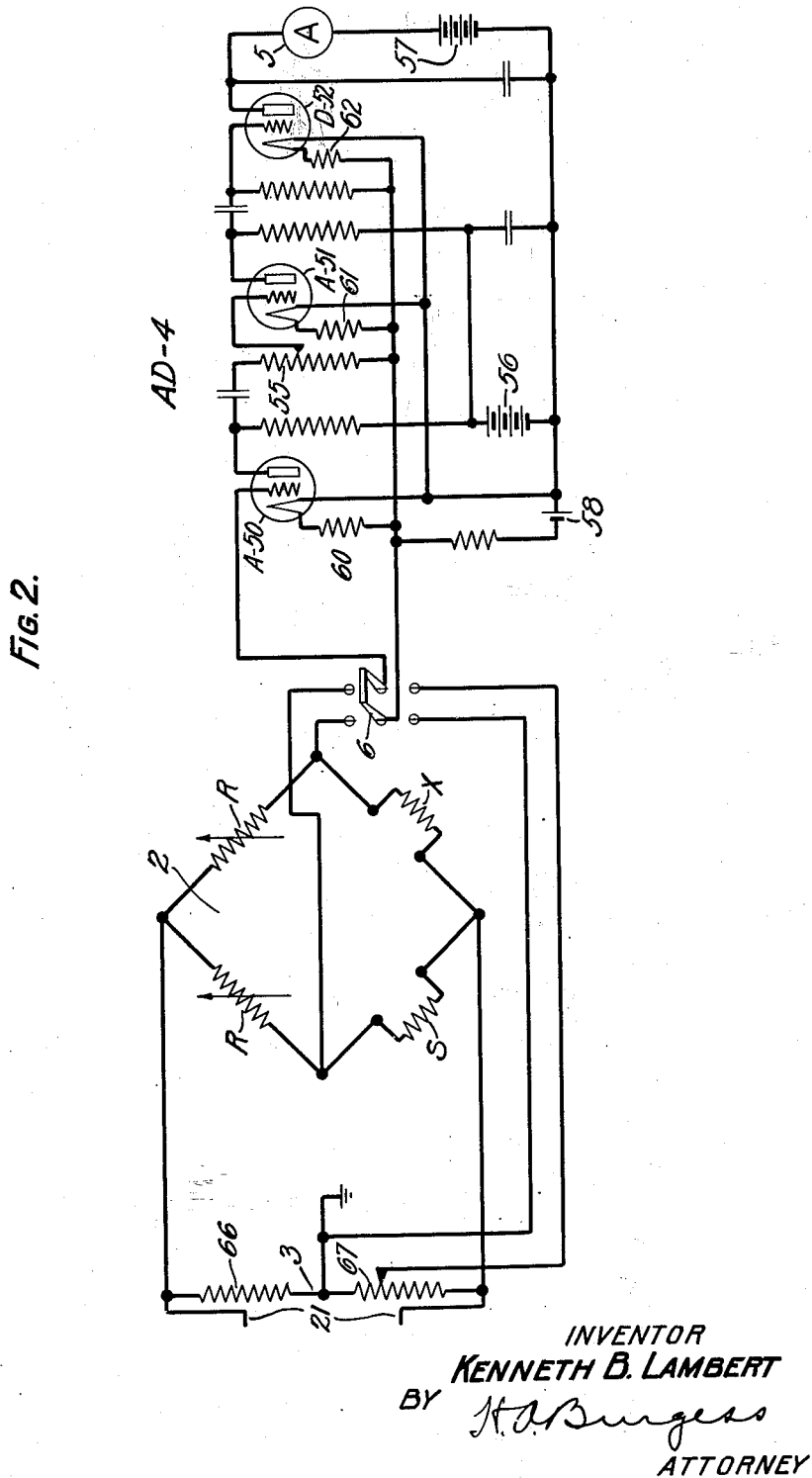

1,848,134

UNITED STATES PATENT OFFICE

KENNETH B. LAMBERT, OF GLEN RIDGE, NEW JERSEY, ASSIGNOR TO BELL TELEPHONE LABORATORIES, INCORPORATED, OF NEW YORK, N. Y., A CORPORATION OF NEW YORK

ELECTRICAL TESTING SYSTEM

Application filed March 24, 1928. Serial No. 264,512.

This invention relates to testing wave transmission apparatus, and especially to measuring electrical characteristics, as for example current reflection coefficients of electrical apparatus.

An object of the invention is to simplify and facilitate such testing and measuring.

Reflections of current which occur at the junction of two circuits of unlike impedances are defined quantitatively by the "reflection coefficient" which is the ratio of the difference of the impedances to their sum. This impedance ratio prescribes the magnitude and phase of the reflected current wave in terms of the incident current wave.

One specific embodiment of the invention is a system for measuring such reflection coefficients quickly and directly. This system is based on the applicant's discovery that if two impedances, whose reflection coefficient for any given frequency is desired, be connected as two arms of a Wheatstone bridge and the impedances of the other arms be properly selected, when voltage of the given frequency is applied to two diagonally opposite corners of the bridge, the resulting open circuit voltage across the other diagonally opposite corners will be directly proportional to the applied voltage and to the reflection coefficient.

In this system an adjustable voltage divider or potentiometer preferably has input terminals connected across the input corners of the bridge and is calibrated to give the desired reflection coefficient directly when so set that the output voltage of the potentiometer equals the output voltage of the bridge.

To facilitate tests over a wide range of frequencies, the voltage for application to the bridge is preferably obtained by combining the waves from two vacuum tube oscillators in a vacuum tube modulator, to yield a combination frequency wave the frequency of which can be varied through a wide frequency range by a small variation of the tuning capacity of one of the oscillators.

Other objects and aspects of the invention will be apparent from the following description and claims.

In the accompanying drawings, Figs. 1 and 2, taken together, show a testing system embodying one form of the invention.

Reflections of current which occur at the junction of two circuits of unlike impedances, as for example, at the junction of a line with a filter to which it is connected, are with the increasing use of carrier frequencies becoming more and more one of the performance criteria of the equipment involved, because of their effects on transmission and cross-talk. These reflections are defined quantitatively by a "reflection coefficient", the vector ratio $$\rho = \frac{Z_1 - Z_2}{Z_1 + Z_2}$$

This factor prescribes the magnitude and phase of the current wave reflected from the junction of the impedances $Z_1$ and $Z_2$ in terms of the current wave which caused the reflection. The power that should with matched impedances be transmitted through the junction will be reduced by the amount contained in the reflected current wave. The reflected cross-talk between a line having a mismatched junction and an adjoining line will be increased in proportion to the magnitude of the reflected wave.

A system shown in the drawings for measuring the magnitude of this reflection coefficient factor quickly and directly comprises a heterodyne oscillator circuit HO—1 shown in Fig. 1 and a Wheatstone bridge 2 shown in Fig. 2 as having a calibrating potentiometer 3 with its input terminals connected across the input corners of the bridge, an untuned resistance coupled amplifier-detector AD—4 with a direct current milammeter 5 in its output circuit, and a double-pole double-throw switch 6 for connecting the input circuit of the amplifier-detector to either the output corners of the bridge 2 or the output terminals of the potentiometer.

The heterodyne oscillator circuit HO—1 is of the general type disclosed in E. O. Scriven Patent 1,357,657, November 2, 1920, and supplies waves of any frequency of a wide range of frequencies to the input corners of the bridge. Circuit HO—1 comprises a fixed frequency electric space discharge oscillator O—10, a variable frequency electric space discharge oscillator O—11, an electric space discharge modulator M—12, and an electric space discharge amplifier A—13.

The amplifier 13 comprises a tube 14 feeding two tubes 17 and 18 which are connected in push-pull relation. Interstage transformer 19 connects tube 14 to tubes 17 and 18. The output transformer 20 impresses waves across the input corners of the bridge 2 through a circuit 21.

The modulator M—12 is of the general type disclosed in R. V. L. Hartley Patent 1,419,562, June 13, 1922. It comprises two tubes 22 and 23 each having its input circuit fed by each of the oscillators through input transformer 24. Waves from each oscillator are impressed upon the grid of tube 23 in a phase opposite to that in which they are impressed on the grid of tube 22. The filaments of tubes 22 and 23 are connected together. The anodes or plates of the tubes are connected together. They are connected to the filaments through two circuits, one comprising an output resistance 25 in series with a source of plate voltage 26 and its shunting condenser 27, and the other comprising an interstage coupling condenser and a resistance 29 across which the grid and filament of tube 14 are connected. The magnitudes of elements 25, 27, 28 and 29 may be of the order of 250,000 ohms, 2 microfarads, 0.5 microfarad, and 500,000 ohms, respectively, by way of example. In the output circuit of the modulator, waves of any given frequency applied to the input circuits of tubes 22 and 23 from oscillator O—10 or oscillator O—11 neutralize each other, and are therefore suppressed. The modulator delivers to amplifier A—13 sum and difference frequency waves resulting from the intermodulation of the waves from oscillators O—10 and O—11 in the modulator. The difference frequencies of the fundamental frequency waves from the two oscillators are transmitted to circuit 21 by amplifier A—13, but the waves of the other frequencies generated in the modulator are above the highest frequency which transformers 19 and 20 transmit efficiently, and therefore are suppressed by those transformers and prevented from reaching circuit 21. To equalize the overall transmission efficiency of oscillator HO—1 and amplifier-detector AD—4 over the frequency range of the voltage delivered to circuit 21, the output circuit of tube 14 includes an attenuation equalizer comprising for example resistances 30, 31, 32 and 33 and condenser 34 connected as shown. Over this frequency range the oscilaltor should afford constant output and continuous variation of frequency.

A small condenser 36 in the frequency determining circuit of oscillator O—10 is variable for adjusting the frequency of the oscillator to the desired fixed value, as for example 118 K. C.

A condenser 37 in the frequency determining circuit of oscillator O—11 is variable to vary the frequency of the oscillator through a wide frequency range, as for example from 107 to 118 K. C. A low-pass filter 45 in the output circuit of oscillator O—10, having a cut-off frequency of 120 K. C. for example, prevents harmonics generated by oscillator O—10 from modulating harmonics generated by oscillator O—11. Reistance 46 in the output circuit of oscillator O—10 prevents reaction upon the oscillator through that circuit. Similarly, resistance 47 in the output circuit of oscillator O—11 prevents reaction upon the oscillator O—11 through that circuit. In the operation of the heterodyne oscillator circuit HO—1, the condenser 37 is adjusted to make the frequency of oscillator O—11 different from that of O—10 by the value of the frequency which it is desired to supply through circuit 21 to the input corners of the bridge 2. This frequency difference can be small compared to the frequencies of oscillators O—10 and O—11, so that the difference frequency can be varied by a large percentage without necessity for a large percentage variation in the frequency of oscillator O—11 or for a large capacity variation in the capacity of condenser 37.

Where the frequencies of oscillators O—10 and O—11 have the values mentioned above by way of example, the transformers 19 and 20 may have low transmission efficiency for waves of frequencies above 12 or 13 kilocycles for instance.

If desired, the condenser 37 may be graduated or calibrated to indicate directly the frequency delivered to circuit 21 by oscillator HO—1.

The amplifier-detector AD—4 comprises an amplifier tube A—50 an amplifier tube A—51 and a detector tube D—52, all in tandem. The amplifier-detector is untuned, and has a very high input impedance. Its interstage coupling circuits are of the resistance-capacity-resistance type, and the grid and filament of the tube A—50 are connected directly to the output corners of the bridge 2 or the outlet terminals of the potentiometer 3 by the switch 6. The gain of the amplifier-detector may be adjusted by a potentiometer 55 in the input circuit of tube A—51. If desired, amplifying stages may be inserted in tandem between A—51 and D—52. Space current for tubes A—50 and A—51 is supplied from source 56. Space current for tube D—52 is supplied from source 57. Filament current for these three tubes is supplied from source 58. Negative grid biasing potential for these tubes A—50, A—51 and D—52 is obtained as voltage drop across resistors 60, 61 and 62, respectively. The biasing potential on the grid of tube A—50 maintains the input impedance of the tube very high.

The potentiometer 3 comprises two equal resistances 66 and 67 connected across the input corners of the bridge 2, with one output terminal at the junction of resistances 55 and 56 and with the other output terminal movable along resistance 67 to adjust the output voltage delivered from the potentiometer to the lower terminals of switch 6.

The bridge circuit 2 as shown comprises ratio arms of impedance R, an impedance S, and an impedance X which may be an unknown impedance in the form of a filter or other apparatus. The impedance S may be an impedance representing a line or other circuit of a type which the apparatus X will face when in actual operation. The open circuit voltage $E_D$ across the output corners of the bridge is:

$$E_D = E \frac{(S-X)}{(S+X)} \frac{R(S+X)}{(R+S)(R+X)}$$

where E is the voltage across the input corners of the bridge. When the factor $$\frac{R(S+X)}{(R+S)(R+X)}$$

(hereafter known as F) is a constant, the ratio $$\frac{E_D}{E}$$

varies only as does the ratio $$\frac{(S-X)}{(S+X)}.$$

F is a constant $$\left(\frac{1}{2}\right)$$

when R=S or when R=X, either one being a sufficient condition for the circuit to be theoretically exact. Since in general the impedance S is much more resistive than reactive in nature, the errors incurred by making the ratio arms of resistances are small. For convenience they may be made variable.

The output impedance of the oscillator should be low in comparison to the impedance of the potentiometer and bridge circuit into which it operates in order that the voltage across the bridge will not be greatly affected by variations in the impedance of the bridge. The nature of the measurements to be made will determine the amounts of harmonics permissible.

When R=S, and when the potentiometer 3 is adjusted so that the meter 5 gives the same deflection when the switch 6 is closed up and when it is closed down, the resistance setting of potentiometer 3 is a measure of the absolute magnitude of the factor $$\frac{(S-X)}{(S+X)}.$$

To make a single frequency measurement of the reflection coefficient ($\rho$) of an unknown impedance vs. a resistance S, the system may be operated as follows:

a. Set the condenser 37 so that the frequency for which the measurement is desired is delivered to circuit 21.

b. Set R=R=S.

c. Connect the unknown impedance X in the bridge as shown.

d. Close switch 6 upwardly and adjust potentiometer 55 so that the needle of meter 5 is about mid-scale.

e. Then close switch 6 downwardly and adjust potentiometer 3 so that the reading of meter 5 is the same as in (d). The setting of potentiometer 3 indicates the value of $\rho$, and the graduations on the potentiometer may be such that this value of $\rho$ is given directly in per cent.

To determine whether $\rho$ exceeds a predetermined maximum in a band of frequencies, the system may be operated as follows:

a. Set R=R=S.

b. Set potentiometer 3 so that its reading is equal to the limiting or maximum permissible value of $\rho$.

c. Set the frequency of the heterodyne oscillator to be within the desired band.

d. Throw switch 6 downwardly and adjust potentiometer 55 so that the needle of meter 5 is about mid-scale.

e. Then close switch 6 upwardly and vary the frequency of oscillator HO—1 over the required band. If the reading of meter 5 exceeds its value in (d) the unknown reflection coefficient $\rho$ exceeds the limit; otherwise the value of $\rho$ does not exceed the permissible limit.

To measure the maximum reflection coefficient in a given frequency range between two networks, of impedances S and X, respectively, neither of which necessarily has a constant resistance impedance characteristic; as for example between a circuit and its balancing network, the system may be operated as follows:

a. Connect the networks in the bridge as shown at S and X.

b. Set the ratio arms R to such a value that the average combined deviations of S and X from R over the frequency range for which the measurement is desired will be as small as possible. To set R equal to the design impedance of the network S or X is usually sufficiently accurate.

c. Close switch 6 upwardly, vary the frequency over the required band, and note the maximum deflection of the meter 5.

d. Close switch 6 downwardly and adjust potentiometer 3 so that meter 5 gives that maximum deflection.

e. Compute the balance of the networks by the formula $$\text{TU balance} = 20 \log_{10} \frac{100}{\rho(\%)}$$

The specific values mentioned herein for frequencies, resistances, etc., are given by way of example only, and the invention is not limited thereto.

What is claimed is:

1. A network for measuring reflection effects between unequal impedances which comprises a Wheatstone bridge with said impedances as two of the arms of the bridge, respectively, and with the impedances of the other bridge arms having such values that the ratio between the output potential difference and the input potential difference across the diagonals of the bridge is directly proportional to the reflection effects to be measured.

2. The method of ascertaining reflection effects between two impedances, which comprises creating a quantity that bears a known relation to the ratio of the difference of the impedances to their sum, and directly measuring said quantity.

3. A network comprising a Wheatstone bridge, means for creating potential difference between diagonally opposite corners of the bridge, and means for comparing the unbalance potential difference between the other diagonally opposite corners with a portion of the first mentioned potential difference and directly indicating a quantity bearing a known constant relation to the ratio of said differences.

4. A Wheatstone bridge for measuring a characteristic of an element connected therein, said bridge having a source of potential difference in one diagonal thereof and means responsive to potential difference across the other diagonal, due to unbalance of the bridge, for giving an indication directly proportional to the latter potential difference, and said bridge having its impedances so adjusted that with the element connected therein the bridge is unbalanced and the ratio of the potential difference across said other diagonal to the potential difference across the first mentioned diagonal is directly proportional to the characteristic to be measured.

5. A system for measuring reflection effects between two impedances, comprising a network adapted for connection of said impedances therein and having an input circuit and an output circuit, a variable voltage attenuator, means for impressing alternating voltage on said network and on said attenuator, and means for comparing the resulting voltage output from said network with that from said attenuator, said attenuator being so calibrated that when set to give a known constant relation between said output voltages its reading is directly proportional to the ratio of the difference of said impedances to their sum.

6. A system for measuring an electrical characteristic of a circuit element, comprising a Wheatstone bridge network adapted for connection of said element therein and having an input circuit and an output circuit, an adjustable wave attenuator connected to said input circuit, means for impressing given electrical variations on said network and on said attenuator, and means for comparing the resulting output wave from said network with that from said attenuator, said attenuator being calibrated to indicate said characteristic directly when set to give a known constant relation between said output waves.

7. A Wheatstone bridge for measuring a reflection coefficient of two unequal impedances forming two of its comparison arms, said bridge having such impedance values for its comparison arms and having as one diagonal an output path of such high impedance that a force created across the other of the bridge diagonals produces a force across said one diagonal directly proportional to said reflection coefficient.

8. A Wheatstone bridge comprising three ratio arms of substantially equal impedances and a fourth ratio arm of a different impedance value, a diagonal including a source of electromotive force variable in frequency, a diagonal including voltage responsive means, potential dividing means connected across said first mentioned diagonal, and means for connecting said potential dividing means to said voltage responsive means.

9. A Wheatstone bridge for measuring a characteristic of an element connected therein, said bridge having in one diagonal thereof a source of constant voltage continuously variable in frequency over a wide frequency range, and said bridge having its impedances so adjusted that with the element connected therein the bridge is unbalanced and the ratio of the potential difference across the other diagonal therof, due to the unbalance of the bridge, to the potential difference across the first mentioned diagonal, is directly proportional to the characteristic to be measured.

10. A network comprising a Wheatstone bridge, said bridge having three arms of substantially equal impedance, a fourth arm of different impedance means for creating potential difference between diagonally opposite corners of the bridge, and means for comparing the unbalance potential difference between the other diagonally opposite corners with a portion of the first mentioned potential difference and directly indicating a quantity bearing a known constant relation to the ratio of said potential differences.

11. A system for ascertaining reflection effects between two impedances, which comprises means for creating a quantity that bears a known relation to the ratio of the difference of the impedances to their sum, and means for directly measuring said quantity.

In witness whereof, I hereunto subscribe my name this 22 day of March, 1928.

KENNETH B. LAMBERT.